April 4, 1944. T. H. KIRK ET AL 2,345,819
MILKING APPARATUS
Filed Sept. 13, 1943

Inventors
Thomas H. Kirk,
William B. Kirk,
By McMorrow & Berman
Attorneys

Patented Apr. 4, 1944

2,345,819

UNITED STATES PATENT OFFICE 2,345,819

MILKING APPARATUS

Thomas H. Kirk, Lake Worth, and William B. Kirk, Lantana, Fla.

Application September 13, 1943, Serial No. 502,178

1 Claim. (Cl. 31—58)

This invention relates to a milking apparatus and more particularly to an attachment for a milking machine of a conventional construction and which makes no provision for indicating when the milking operation is finished.

The primary object of this invention is the provision of a device which may be readily inserted in the conduits connecting the teat cups to the machine proper for indicating the flow of milk therebetween so that a person at a glance can determine when the milking operation should be discontinued to prevent overmilking of a cow and the injury which may occur to the cow if the milking operation is permitted to continue for a period of time after the flow of milk has stopped.

Another object of the invention is the provision of a device which is extremely easy to install and remove from a milking machine and may be quickly taken apart for cleaning.

With these and other objects in view as will become more apparent as the description proceeds, the invention consists in certain novel features of construction, combination and arrangement of parts as will be hereinafter more fully described and claimed.

For a complete understanding of our invention, reference is to be had to the following description and accompanying drawing, in which Figure 1 is a top plan view illustrating a milking apparatus equipped with an attachment constructed in accordance with my invention.

Figure 1:
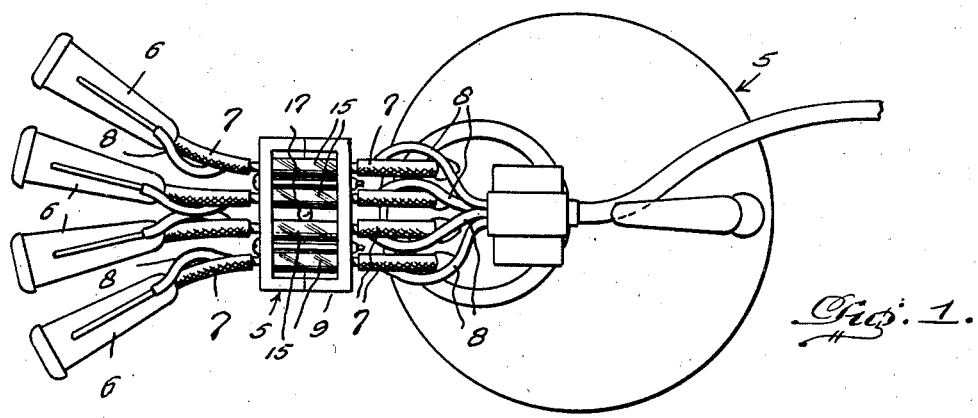
Figure 2:
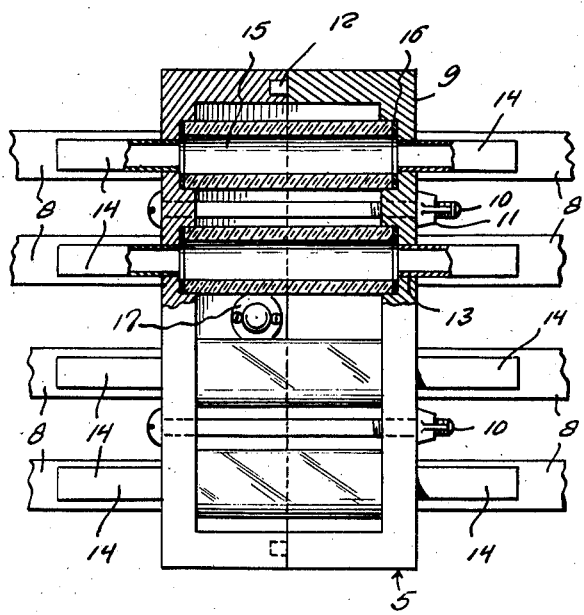
Figure 2 is a fragmentary plan view, partly in section, illustrating the attachment and its connection with the machine proper and the teat cups.
Figure 3:
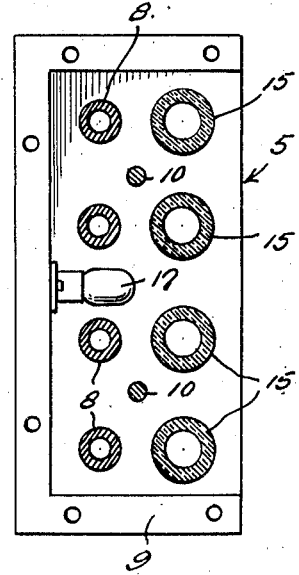
Figure 3 is a transverse sectional view illustrating the attachment.

Referring in detail to the drawing, the numeral 5 indicates generally a milking machine of a conventional construction, the teat cups being indicated by the character 6 and connected to the machine proper by milk tubes 7 and suction tubes 8, the tubes 7 and 8 being of a flexible nature so as to permit the cups to be conveniently applied to the teats of a cow.

In adapting the present invention to the milking machine, the tubes 7 are cut or severed forming each tube into sections to permit said sections to be readily connected to the attachment or present invention.

A box-like structure 9 is provided which has one side thereof open to expose the interior and is composed of companion sections detachably connected by tie bolts 10 provided with wing nuts 11 to permit the sections of the box-like structure to be conveniently assembled and taken apart when necessary. Dowel pins 12 are provided between the sections of the box-like construction to properly align the sections when brought together.

Opposite walls of the box-like structure are provided with openings to permit the suction tubes 8 to extend through the box-like structure after being detached from the teat cups. It is to be understood that the suction tubes 8 are reapplied to the teat cups after being passed through the box-like construction. The opposite walls of the box-like structure are further provided with openings 13 in which are fitted tightly nipples 14 of rigid construction. The nipples 14 do not extend entirely through the openings 13 but extend for a distance exteriorly of the box-like structure to permit the sections of the tubes 7 to be attached thereto.

The inner ends of the openings 13 are enlarged to form seats in which are positioned the ends of transparent sight tubes 15. Gaskets 16 are interposed between the ends of the sight tubes and the seats to prevent leakage. Thus it will be seen that the milk flowing from the teat cups to the machine proper must pass through the sight tubes which can be easily viewed by a person and permit such person to readily determine when the milking operation is nearing a stage when the action of the machine should be stopped to prevent overmilking of the cow. Also the arrangement described, will permit the person to judge the flow of milk from each teat cup and if the flow should be slower through one of the sight tubes than the remaining tubes, it may indicate that the teat cup attached thereto is not properly applied to the cow.

In order that the flow of milk through the sight tubes can be easily seen in the dark, an electric lamp 17 is arranged in the box-like structure.

It will be noted from the foregoing description, taken in connection with the accompanying drawing, that it is extremely easy to adapt the present invention to a milking apparatus or machine and that the attachment can be easily taken apart while remaining attached to the machine so as to clean the interior thereof as well as the sight tubes to keep the attachment in a highly sanitary condition.

Electricity may be furnished to the electric lamp in any well known manner, such as providing an extension cord (not shown) to permit the electric lamp to be plugged into an ordinary electric output.

While we have shown and described the preferred embodiment of our invention, it will be understood that minor changes in construction, combination and arrangement of parts may be made without departing from the spirit and scope of the invention as claimed.

Having thus described the invention, what we claim is:

In an attachment for a milking apparatus, a box-like structure having one side open and provided with openings in opposite walls thereof, nipples fitted in said openings and adapted to have tubes leading from teat cups to a milking machine attached thereto, seats formed in the openings of the box-like structure, and sight tubes fitted in said seats, said box-like structure including companion sections, dowel pins connecting said sections, and tie bolts extending through said sections.

THOMAS H. KIRK.
WILLIAM B. KIRK.